(12) United States Patent
Radermacher et al.

(10) Patent No.: US 8,242,710 B2
(45) Date of Patent: Aug. 14, 2012

(54) DRIVER DEVICE FOR A LOAD AND METHOD OF DRIVING A LOAD WITH SUCH A DRIVER DEVICE

(75) Inventors: Harald Josef Guenther Radermacher, Aachen (DE); Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 286 days.

(21) Appl. No.: 12/666,826

(22) PCT Filed: Jun. 30, 2008

(86) PCT No.: PCT/IB2008/052616
§ 371 (c)(1),
(2), (4) Date: Dec. 28, 2009

(87) PCT Pub. No.: WO2009/004563
PCT Pub. Date: Jan. 8, 2009

(65) Prior Publication Data
US 2010/0181936 A1 Jul. 22, 2010

(30) Foreign Application Priority Data
Jul. 2, 2007 (EP) ..................... 07111559

(51) Int. Cl.
*H05B 37/02* (2006.01)
(52) U.S. Cl. ........... 315/306; 315/119; 315/307
(58) Field of Classification Search .......... 315/119, 315/123, 125, 128, 185 R, 188, 291, 297, 315/306–308; 323/220, 223, 282
See application file for complete search history.

(56) References Cited

U.S. PATENT DOCUMENTS

| | | | |
|---|---|---|---|
| 6,801,003 B2 * | 10/2004 | Schanberger et al. | 315/291 |
| 6,870,328 B2 | 3/2005 | Tanabe et al. | |
| 7,228,190 B2 * | 6/2007 | Dowling et al. | 700/94 |
| 7,528,587 B2 * | 5/2009 | Wu et al. | 323/282 |
| 7,781,979 B2 * | 8/2010 | Lys | 315/185 S |
| 2001/0033503 A1 * | 10/2001 | Hamp et al. | 363/73 |
| 2004/0090403 A1 | 5/2004 | Huang | |
| 2005/0243022 A1 | 11/2005 | Negru | |
| 2006/0234779 A1 | 10/2006 | Haener et al. | |
| 2006/0244396 A1 | 11/2006 | Bucur | |
| 2008/0012507 A1 * | 1/2008 | Nalbant | 315/306 |

FOREIGN PATENT DOCUMENTS

| | | | |
|---|---|---|---|
| DE | 4228644 | A1 | 3/1994 |
| DE | 10358447 | B3 | 5/2005 |
| EP | 0688152 | A1 | 12/1995 |
| EP | 0992961 | A2 | 4/2000 |
| WO | 9602970 | A1 | 2/1996 |
| WO | 9713307 | A1 | 4/1997 |

* cited by examiner

*Primary Examiner* — Tung X Le
(74) *Attorney, Agent, or Firm* — Mark L. Beloborodov

(57) ABSTRACT

The invention relates to a driver device for a load (11), particularly an LED/OLED unit (12; 20, 22), comprising a shunting switch (30) parallel to the load, a control unit (14, 26) for controlling the shunting switch (30), an energy storage element (40) adapted to supply energy to at least the control unit (14, 26), and a recharge control circuitry (46) arranged in series with the energy storage element (40), the series connection of energy storage element (40) and recharge control circuitry (46) being provided parallel to the shunting switch (30), wherein said control unit (14, 26) is adapted to activate said recharge control circuitry (46) and to switch said shunting switch (30) off, when said energy storage element (40) is to be recharged. The invention also relates to a method of driving a load (11).

10 Claims, 1 Drawing Sheet

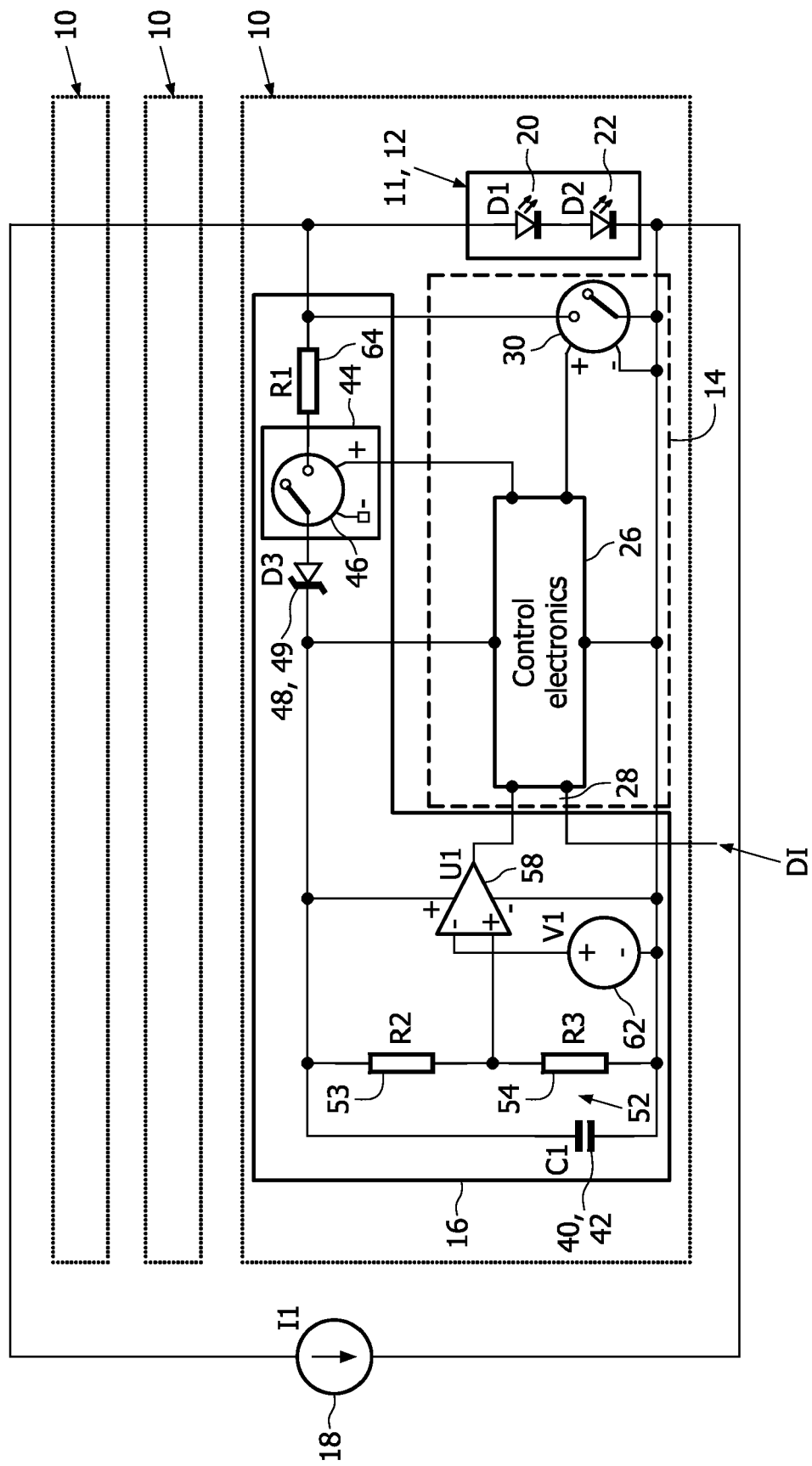

DRIVER DEVICE FOR A LOAD AND METHOD OF DRIVING A LOAD WITH SUCH A DRIVER DEVICE

FIELD OF THE INVENTION

The present invention relates to a driver device for a load, particularly an LED/OLED unit. The invention also relates to a method of driving a load with such a driver device.

BACKGROUND OF THE INVENTION

Light emitting diodes (LEDs) or organic light emitting diodes (OLEDs) will increasingly be used for decorative purposes or for display applications. To have a high resolution and smooth transitions, a large number of light spots are required. In many of these applications, electronic circuits are used to control the LEDs, particularly the status (on/off) of the LED. As it is known in the art, the on/off condition can be controlled via a shunting switch which is coupled parallel to the respective LED. If the shunting switch is on (closed), the LED is shunted and, hence, off. If the shunting switch is off (open), the LED is on, since the drive current does not flow through the shunting switch. Beside the status (on/off) of the LED, its average brightness or light intensity may also be controlled by switching the shunting switch according to a predetermined or selectable duty cycle.

In all these cases, the control circuits require a power supply supplying the necessary energy. This requirement results in either additional wires to feed the supply voltage to the on-site control circuit or in a power supply which can derive its power from the LED supply. In most cases, the second solution will create additional losses or will have unwanted influence on the LED behavior.

SUMMARY OF THE INVENTION

In view of the above, it is an object of the present invention to provide a driver device for a load and a method of driving a load with such a driver device, by means of which the above-mentioned advantages are overcome. Particularly, the driver device should not have additional wires to feed the supply voltage to the on-site control circuit, and additional losses or influences on the load behavior should be avoided.

These and other objects of the present invention are achieved by a driver device for a load, preferably a light unit, particularly an LED/OLED unit, which comprises:
  a shunting switch parallel to the load,
  a control unit for controlling this shunting switch,
  an energy storage element adapted to supply energy to at least the control unit, and
  a recharge control circuitry arranged in series with the energy storage element, the series connection of energy storage element and recharge control circuitry being provided parallel to the shunting switch, wherein said control unit is adapted to activate said recharge control circuitry and to switch said shunting switch off, when said energy storage element is to be recharged.

In other words, the driver device has its own power supply which supplies at least the control unit with the required power. The power supply comprises an energy storage element which is adapted to store and supply power. The energy for recharging the energy storage element is derived from the drive current, however, only in periods during which the light unit is switched off. Nevertheless, the shunting switch is also switched off to generate a voltage drop across the load by the drive current which is used to recharge the energy storage element. In order to avoid that the load is switched on again, the voltage drop across the energy storage element and the control unit is below the forward voltage necessary for powering the load, preferably for having the light unit radiate light.

The present invention has the advantage that, first, no additional wires for feeding a supply voltage to the control circuit are necessary. And, second, the used energy storage element, which feeds the supply voltage to at least the control unit, does not influence the behavior of the load, preferably the LED. Particularly, there is no decrease in light intensity, since the energy for recharging the storage element is derived from the drive current in periods during which the respective light unit is switched off.

In a preferred embodiment, said recharge control circuitry comprises a control switch which is switched on when activated. However, the recharge control circuitry may also comprise a DC/DC-converter, which is operated when activated.

In a preferred embodiment, the load is a light unit, preferably an LED/OLED unit.

In a preferred embodiment, the energy storage element comprises at least one capacitor.

The advantage is that capacitors are components which are cheap and easy to implement.

In a preferred embodiment, said light unit comprises one or more light emitting diodes (LEDs) or organic light emitting diodes (OLEDs) coupled in series and/or in parallel.

The inventive driver device is advantageous when used for controlling light emitting diodes. It is to be noted that in the context of the present application, the expression "LED" or "LED unit" means LED or OLED or series connection or parallel connection or mixed series and parallel connection of LED/OLED elements.

In a preferred embodiment, a voltage comparator is provided for comparing the voltage across the energy storage element with a reference value and for generating a recharge control signal for the control unit when the voltage falls below the reference value.

In other words, a recharge cycle is started by the control unit when the voltage across the energy storage element is below a predetermined reference value. Hence, the recharging cycle is not time-dependent but voltage-dependent.

Nevertheless, it is also possible to design the recharge cycle so as to be time-dependent, meaning that recharging the energy storage element is carried out in a varying or fixed time pattern.

However, it is to be noted that the recharge cycle is only carried out during phases of a non-activated light unit (not radiating light).

In a preferred embodiment, a series connection of two resistors is coupled parallel to the energy storage element for supplying a voltage signal to the voltage comparator.

In other words, a voltage divider is used to generate a voltage signal which is equivalent to the voltage across the energy storage element. This solution of two resistors forming a voltage divider is a very cheap and easy implementation of a voltage sensor element.

In a further preferred embodiment, said control unit is adapted to control the current driven through the light unit by switching said shunting switch on and off such that the load is driven with a maximum duty cycle of 99.9%, and to recharge said energy storage element in the remaining time when the load is off.

As already mentioned before, the recharge cycle may be carried out independent of the voltage across the energy storage element but dependent on time. This, however, means that the control unit must not switch on the light unit continuously, which would correspond to a duty cycle of 100%. Rather, the maximum duty cycle has to leave time during which the light unit is switched off and the storage element may be recharged. A maximum of the duty cycle of 99.9% is sufficient for recharging purposes.

In order to avoid overcharging of the energy storage element, a Z-diode is provided parallel to the energy storage element as overcharging protection.

Alternatively, said control unit is adapted to monitor the voltage across said energy storage element and to stop its recharging when said monitored voltage achieves a predetermined level.

In a preferred embodiment, said recharge control circuitry is adapted to have a supply voltage which is less than the forward voltage of the load.

In a preferred embodiment, said recharge control circuitry and said shunting switch as well as said control signals are arranged to allow automatic startup of the driver device.

The above-mentioned object is also achieved by a method of driving a load, preferably a light unit, with a driver device comprising a shunting switch parallel to said load, a recharge control circuitry, an energy storage element connected in series with said recharge control circuitry, said series connection being parallel to said shunting switch, and a control unit for controlling said shunting switch and said recharge control circuitry, wherein for recharging said energy storage element said method comprises the steps of:

activating said recharge control circuitry, switching said shunting switch from on to off, switching said shunting switch on again after a predetermined time period and/or when the voltage across the energy storage element reaches a predetermined value, and deactivating said recharge control circuitry again.

Preferably, said recharge control circuitry is provided as a control switch, said activating step comprising the step of switching said switch on and said deactivating step comprising the step of switching said switch off.

However, the recharge control circuitry may also be provided as e.g. a DC/DC-converter, which is operated when activated.

Preferably, said recharging is carried out in a predetermined time pattern.

Alternatively, said recharging is carried out when the voltage across said energy storage element falls below a predetermined value.

Preferably, said recharging is adapted to the desired operation intervals of the load, in such a way that the recharging is performed during time intervals when no energy is to be supplied to the load.

The inventive method provides the same advantages as the driver device mentioned above, so that there is refrained from repeating these advantages again.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWING

An embodiment of the invention is shown in the drawing and will be explained in more detail in the description below with reference to same.

In the drawing, FIG. 1 shows a schematic block diagram of a driver device according to the present invention.

In FIG. 1, a driver device is schematically shown and indicated with reference numeral 10.

DETAILED DESCRIPTION OF EMBODIMENTS

The driver device 10 comprises a load 11, which is preferably provided as a light unit 12 in the present embodiment. The light unit 12 is preferably an LED unit, comprising one or more LEDs 20, 22. As already mentioned before, "LED" means LED or OLED or a series connection or a parallel connection or a mixed series and parallel connection of LED and/or OLED elements.

The serially-connected LEDs 20, 22 are driven by a current source 18 supplying a current I1. The current source 18 is not part of the driver device 10.

The driver device 10 further comprises a control unit 14 and an energy storage unit 16.

The control unit 14 comprises a control circuit 26 and a shunting switch 30 which is coupled parallel to the light unit 12. The shunting switch 30, which is preferably an electronic switch like a transistor or a field effect transistor, is controlled by the control circuit 26 and serves to shunt the light unit 12.

If the shunting switch 30 is open or off, there is no bypass between both ends of the light unit 12, so that the drive current I1 may pass through the light unit 12 which, as a result, radiates light.

If the shunting switch 30 is closed (switched on), there is a bypass between both ends of the light unit 12, as a result of which no drive current passes through the light unit 12. The light unit 12 is then switched off and does not radiate light.

Further, the control unit 14 comprises a data input 28 which receives an external switching signal DI. The activation of the shunting switch 30 and a switch 46, which will be described below, may be generated based on internal data available in the control circuit 26, the signal DI and a further signal from the energy storage unit 16.

As it is apparent, the control circuit 26 requires a supply voltage which, in the present embodiment, is provided by the energy storage unit 16.

The control circuit 26 mainly serves to control the duty cycle of the shunting switch 30. The duty cycle, i.e. the ratio or frequency of on and off states of the shunting switch 30, allows controlling the brightness and light intensity, respectively, of the LEDs 20, 22. The control signals for switching the shunting switch 30 are either generated by the control circuit 26 or by a master unit. In the latter case, the control circuit 26 serves as a receiver for the switching signal DI'.

The energy storage unit 16 comprises an energy storage element 40 preferably in form of one or more capacitors 42. Further, a recharge control circuitry 44 is coupled in series with the capacitor 42, with a decoupling diode 48, provided as a Schottky-diode 49 or Z-diode, being connected between the capacitor 42 and recharge control circuitry 44. In the present embodiment, the recharge control circuitry is provided as a switch 46 which is hereinafter referred to as control switch. However, the recharge control circuitry may also be provided as a DC/DC-converter.

The series connection of control switch 46, decoupling diode 48 and energy storage element 40 is connected parallel to the light unit 12 and, hence, also parallel to the shunting switch 30. The control switch 46 may be provided as an electronic switch, preferably a bipolar transistor or field effect transistor.

Generally, the energy necessary for operating the control circuit 26 and the shunting switch 30 is supplied to the control unit 14 by the energy storage element 40. The energy stored in the energy storage element 40 is provided by the current source 18 during a recharge cycle, which will be described later.

Further, FIG. 1 shows a resistor 64 in series with the control switch 46 and symbolizing the parasitic resistance of the circuit.

In the preferred embodiment shown in the FIGURE, the energy storage unit 16 comprises a voltage divider 52 consisting of two resistors 53 and 54 connected in series. The series connection 52 is connected parallel to the energy storage element 40 and serves to generate a signal which depends on the voltage across the energy storage element 40. This voltage signal is supplied to a first input of a voltage comparator 58 which receives at a second input a reference voltage from a reference voltage source 62. The output of the voltage comparator 58 is supplied to the control circuit 26.

It is to be noted that the voltage comparator 58 and the voltage divider 52 are not parts which are necessary for the operation of the driver device 10. Rather, the recharging process may also be controlled (e.g. using fixed timing as described below as second embodiment) only by the control circuit 26 without voltage comparator 58 and voltage divider 52.

The operation of the driver device 10, particularly the charging or recharging of the energy storage element 40, will now be described:

During a radiating phase, the shunting switch 30 is open (switched off), so that the drive current I1 from the current source 18 passes the light unit 12 which, as a result, radiates light. In order to prevent current from flowing into the energy storage element during the radiating phase, the control switch 46 is opened. Further, the energy necessary for the control circuit 26 and the switches 30, 46 is supplied by the energy storage element 40.

During a non-radiating phase, the shunting switch 30 is closed (switched on), so that there is a bypass between both ends of the light unit 12. Hence, the drive current I1 is not driven into the light unit 12, as a result of which the light unit 12 does not radiate light.

As it is known in the art, both phases alternate in a predetermined or selectable manner, particularly in order to control the brightness of the light unit 12. The ratio between radiating and non-radiating phases and, hence, between the off and on states of the shunting switch 30, is called "duty cycle". A duty cycle of 100% for example means that the radiating phase is 100% and the non-radiating phase is 0%.

In order to avoid any influence on the light unit 12, the charging or recharging cycle is preferably carried out during the non-radiating phases.

To charge or recharge the energy storage element 40, the control switch 46 is closed and the shunting switch 30 is opened.

Then, the anode potential of the light unit 12, particularly the LEDs 20, 22, is fed to the energy storage element 40 via the control switch 46 and the decoupling diode 48. The drive current I1 will then charge the energy storage element 40, so that the voltage across the energy storage element increases linearly over time. When the voltage is higher than the reference value determined by the voltage source 62 and the voltage divider 52, the shunting switch 30 is closed again, and the control switch 46 is opened.

Although the shunting switch 30 has been opened, the LEDs 20, 22 do not reach the radiating phase, since the voltage drop across the energy storage element 40 and the control unit 14 is selected such that it is below the forward voltage of the LEDs 20, 22. Hence, no unwanted light output is produced, even when shunting switch 30 is opened.

Nevertheless, the charging or recharging cycle has to be stopped before the voltage across the energy storage element 40 reaches the respective forward voltage. This is ensured by appropriately setting the reference value mentioned above.

In the embodiment shown in the FIGURE, the recharging cycle is started when the voltage across the energy storage element 40 falls below a certain predetermined reference voltage. This comparison is carried out by the comparator 58, which generates a signal destined for the control circuit 26. The recharging cycle is then started, provided that the light unit 12 is in the non-radiating phase. Otherwise, it is waited until the non-radiating phase begins. Alternatively, the recharging process may be carried out during a radiating phase of the light unit 12, but this would influence the light emission of the light unit.

Recharging during the radiating phase could for example be applied when the supply voltage delivered by the energy storage 16 falls below the minimum supply voltage requirements of the control unit 14.

The recharging cycle is stopped when the voltage across the energy storage element 40 is higher than the reference value.

Due to the time delays involved in switching, there will be a certain hysteresis related to this sequence, which will prevent the circuit from running at an infinitely high frequency. Of course, it is possible to add a certain hysteresis to the comparator.

In a second embodiment, which is not shown in the FIGURE, the process of recharging the energy storage element 40 is not started as a result of a voltage comparison, but rather, the recharging cycle is started in a fixed or selectable time pattern, for example always during each non-radiating phase. In order to protect the energy storage element 40 against overcharging, and to avoid reaching the forward voltage threshold of the load 11, the recharging process is carried out for a short time which is determined on the basis of known power consumption of the circuit. Alternatively, a Z-diode may be coupled parallel to the energy storage element 40 as an overcharging protection means. Further, alternatively, the control circuit 26 may be adapted to monitor the voltage across the energy storage element 40 and to stop the recharging cycle when this voltage reaches a predetermined value.

In this embodiment, it has to be ensured that the duty cycle is less than 100%, for example maximum 99.9%. 0.1% of the period can be sufficient to feed the necessary energy to the energy storage element 40 during the non-radiating phases.

In this embodiment, it is, hence, not necessary any more to compare the voltage across the energy storage element 40 in respect of its value falling below the reference voltage.

The driver device 10 shown may be provided multiple times in a series connection, as schematically shown in FIG. 1. Further, it can be used in all kinds of LED lamps where a large number of LEDs have to be controlled individually, e.g. a general illumination with individual control of each LED to achieve homogeneous light distribution even with different LED bins. In addition to the use as a LED-Driver, the driver device of the present invention could be applied to derive power from a current source in further cases. For example, a fan could be used in place of the light unit 12. In a similar manner as explained above, the circuit could derive its power from the current source and control the fan. Even without any load the circuit could be used. In these cases, the light unit 12 would be omitted. The switch 30 would be closed most of the time, thereby enabling low loss circulation of the current I1. The recharge procedure would be the same as mentioned above. This circuit could be used to power a sensor in a LED string.

For those skilled in the art, it is obvious that the startup of the circuit can be managed very easily. One possible embodiment is as follows: A switch which is open when no drive signal is applied is used as shunting switch 30. The same type of switch is used for the control switch. The drive signal for the control switch coming from the control electronics 26 has a high impedance when the control electronics is not powered (e.g. provided as a so-called open collector or open drain signal). A resistor is placed from the positive terminal of the load 11 to the control input of the control switch. Of course, other embodiments are possible, e.g. using a type of switch which is closed when no drive signal is applied for the control switch 30. With such a configuration, upon initial current flow from the current source 18, the charging of the energy storage 40 will start automatically. When the minimum required voltage level is reached, the circuit can go into normal operation as described above.

To sum up, the present invention is about a concept/topology for LED-driving for serially-connected LEDs with separate control. The inventive circuit offers the possibility to readily and economically drain the electrical power—required for additional on-site electronics—from the current source which powers the LEDs. This offers the possibility to attach the electronics to one or several LEDs without the need for an additional power supply. The inventive concept is compatible with the serial connection of several of such driver devices. The control circuit 26 may, for example, be provided as a microcomputer, and the control unit 14 itself may comprise a driver, a sensor, etc.

The invention claimed is:

1. A driver device for a load provided by a current from a current source, said driver device comprising:
   a shunting switch connected parallel to the load for shunting the load when switched on,
   a control unit for controlling the shunting switch,
   an energy storage element for supplying energy to at least the control unit,
   a recharge control circuitry arranged in series with the energy storage element, the series connection of energy storage element and recharge control circuitry being provided parallel to the shunting switch, wherein said control unit is configured
   i) to activate said recharge control circuitry and to switch said shunting switch off, when said energy storage element is to be recharged by said current from said current source, and
   ii) to deactivate said recharge control circuitry and to switch said shunting switch on after a predetermined time period and/or when the voltage across the energy storage element reaches a predetermined value.

2. Driver device of claim 1, wherein said recharge control circuitry is a switch which is switched on when activated.

3. Driver device of claim 1, wherein said recharge control circuitry is a DC/DC-converter, said DC/DC-converter being operated when activated.

4. Driver device of claim 1, wherein said load is an LED/OLED unit.

5. Driver device of claim 1, wherein said energy storage element comprises at least one capacitor.

6. Driver device of claim 1, wherein a voltage comparator is provided for comparing the voltage across the energy storage element with a reference value and for generating a recharge control signal for the control unit when the voltage falls below the reference value.

7. Driver device of claim 1, wherein said control unit is adapted to control the current driven through the load by switching said shunting switch on and off such that the load is driven with a maximum duty cycle of 99.9% and to recharge said energy storage element in the remaining time when the load is off.

8. Driver device of claim 7, wherein said control unit is adapted to monitor the voltage across said energy storage element and to stop recharging when said monitored voltage achieves a predetermined level.

9. Driver device of claim 1, wherein said control unit is adapted to have a supply voltage which is less than the forward voltage of the load.

10. Driver device of claim 1, wherein said recharge control circuitry is adapted to have a supply voltage which is less than the forward voltage of the load.

* * * * *